United States Patent [19]
Merrick et al.

[11] 4,146,192
[45] Mar. 27, 1979

[54] FILLER WIRE SPOOL SUPPORTING APPARATUS

[75] Inventors: George J. Merrick, Franklin; George E. Cook, Brentwood; Donald D. Modglin, Nashville, all of Tenn.

[73] Assignee: Merrick Welding International, Inc., Nashville, Tenn.

[21] Appl. No.: 857,358

[22] Filed: Dec. 5, 1977

Related U.S. Application Data

[62] Division of Ser. No. 654,975, Feb. 3, 1976.

[51] Int. Cl.² ............................................. B65H 49/00
[52] U.S. Cl. .................................................. 242/129.8
[58] Field of Search ....................... 242/68, 68.1, 68.3, 242/129.5, 129.8

[56] References Cited

U.S. PATENT DOCUMENTS

| | | | |
|---|---|---|---|
| 3,294,337 | 12/1966 | Jacob | 242/68.3 |
| 4,050,647 | 4/1976 | Linam | 242/129.8 |

Primary Examiner—Leonard D. Christian
Attorney, Agent, or Firm—Jones, Thomas & Askew

[57] ABSTRACT

Filler wire spool support for welding applications in which filler wire is supplied to a weld puddle. The present spool support apparatus is readily manipulated to replace the filler wire spool without the use of tools.

7 Claims, 3 Drawing Figures

FILLER WIRE SPOOL SUPPORTING APPARATUS

This is a division of application Ser. No. 654,975, filed Feb. 3, 1976.

This invention relates in general to welding and in welding torches of the type in which a quantity of filler material is supplied to the weld puddle.

Transmission pipelines are frequently used to transport fluid products for substantial distances, with oil and gas transmission pipelines being but two well-known examples. Such pipelines are generally constructed of individual pipe sections that are joined together by welding, and it is important that each welded pipe joint meet the criteria necessary for safe operation of the pipeline. Not only is the detection and repair of defective joints an extremely expensive undertaking, particularly where the pipeline is buried underground or submerged beneath the sea, but the existence of a defective weld joint creates a hazard of catastrophe in the case of pipelines which carry flammable products.

The separate lengths of pipe which make up an oil or a gas transmission pipeline are typically interconnected by electric-arc welding, and many types of welding techniques are used or proposed in the art for that purpose. Perhaps the simplest welding technique is shielded metal arc welding, commonly known as "stick welding", in which one or more persons manually weld each joint using hand-held welding torches of conventional design. Since each welded joint of a typical pipeline actually consists of several separate weld segments or layers, known as "passes", manual welding techniques are time-consuming and costly in view of the large number of welded pipe joints to be welded in a pipeline extending for many miles. The relative slowness of manual and other conventional welding techniques is particularly troublesome in pipe laying operations where wages and equipment expenses provide a costly overhead which must be rationalized by maximizing the number of acceptable welds that can be produced per unit of time.

The speed at which a pipejoint can be welded is determined by the maximum rate at which the welding torch can deposit weld metal while traversing a pipe joint which is in a nonhorizontal plane. While gas metallic arc (MIG) welding torches generally have a relatively high rate of metal deposition, such torches generally produce welds that are nonuniform and difficult to repeatably obtain. Gas tungsten arc (TIG) welding torches are known to produce a pipe joint weld of superior and more repeatable quality, although the metal deposition rate for TIG welding torches is relatively slow. A development known as the hot-wire TIG torch, in which electric current is passed through the filler wire to preheat the filler wire which is melted in the weld puddle, is known to produce a substantially increased rate of metal deposition, relative to conventional TIG welding. The lack of sufficiently precise and repeatable weld parameter control of prior-art hot-wire TIG welding torches, however, along with the aforementioned problem of off-axis weld puddle control and related problems, have heretofore kept the metal-deposition rates of hot-wire TIG torches from being fully realized in pipeline welding applications. A description of hot-wire TIG welding is set forth in U.S. Pat. No. 3,122,629.

It is an object of the present invention to provide an improved apparatus for supporting spools of material.

It is another object of the present invention to provide improved apparatus for supporting spools of filler wire used in conjunction with welding equipment.

Stated in general terms, the present invention comprises a mandrel on which a wire spool may be mounted, and to which a variable drag may be imparted. A spool-retaining latch is provided for easy manipulation by hands wearing gloves or mittens.

The foregoing and other objects and advantages of the present invention will become more readily apparent from the disclosed preferred embodiment as described below with respect to the drawings, in which.

Figure 1:
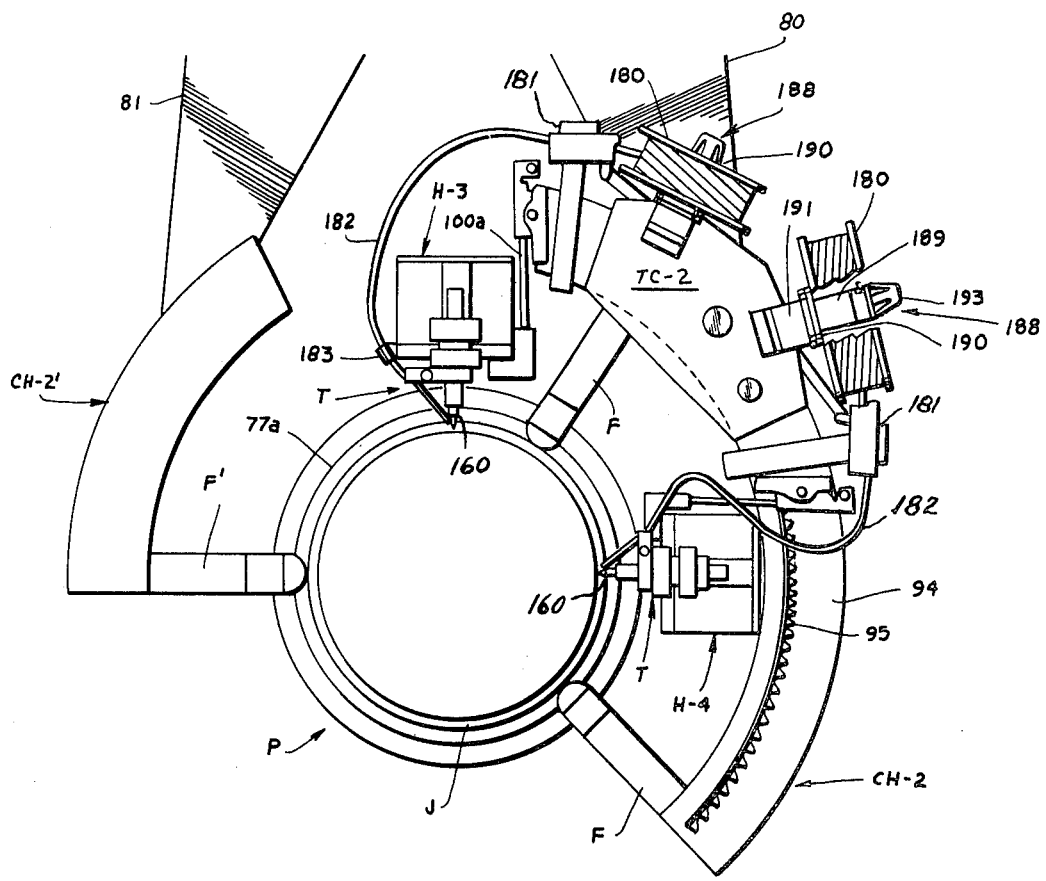
FIG. 1 is a fragmentary elevation view showing an example of welding apparatus including a filler wire spool holder according to the disclosed embodiment of the present invention.

Turning to FIG. 1, there is shown an example of automatic welding apparatus including the disclosed embodiment of the spool holder according to the present invention. A pair of clamp arms 80 and 81 are fragmentarily shown in FIG. 1, and terminate in half-clamps CH-2 and CH-2', which partially surround a pipe section P having a joint J to be welded. The half-clamps have clamp feet F, F, F' which extend radially inwardly from the respective half-clamps to engage the end 77a of the pipe P.

The half-clamp CH-2 includes a track 94 on which the movable carriage TC-2 is supported to traverse a portion of the pipe joint J. A rack gear 95 on the half-track CH-2 is utilized to drive the carriage about the arc-shaped track 94.

A pair of welding head assemblies H-3 and H-4 are connected to the carriage by the respective support rods 100a, and each of the welding head assemblies carries a welding torch assembly T. Further details of the welding torch supported apparatus and the pipe clamp assembly may be found by reference to copending application Ser. No. 654,975 filed Feb. 3, 1976.

Each torch assembly T which utilizes the aforementioned hot-wire process is supplied with filler wire from a separate spool 180 by way of a wire drive 181 and the flexible hollow guide tube 182 which conveys the feed wire to a point adjacent the lower end 160 of the torch assembly. Those skilled in the art will realize that a flow of electrical current, preferably AC, for $I^2R$ heating purposes is established between the filler wire and the weld puddle at the pipe joint J by passing the wire through an electrical contact tube 183 located adjacent the torch T.

Figure 3:
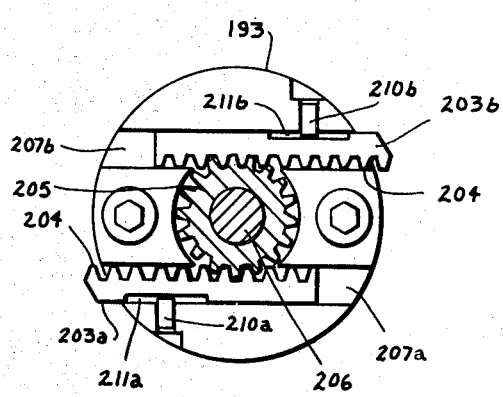
FIG. 3 is a section view taken along line 3—3 of FIG. 2.
Figure 2:
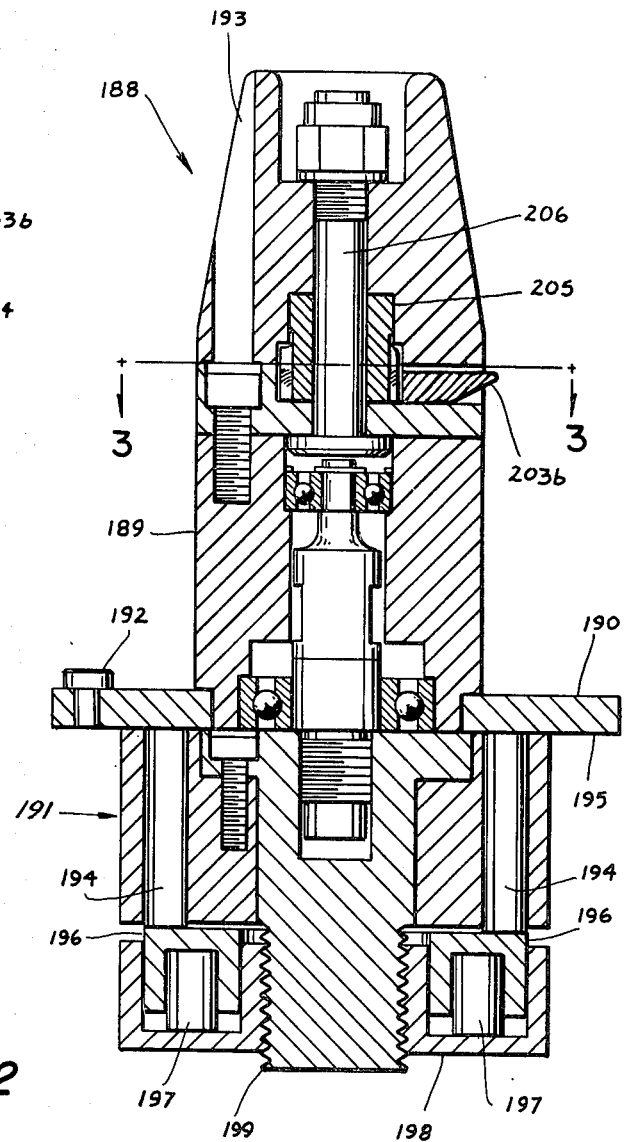
FIG. 2 is a vertical section view of the filler wire spool holder according to the disclosed embodiment of the present invention.

Each spool 180 is removably supported on a spool holder 188 having a mandrel 189 capped by a latching knob 193. As best seen in FIGS. 2 and 3, the mandrel 189 extends outwardly from the plate 190, and both the plate and the mandrel are interconnected for rotation relative to the body 191. A button 192 on the upper side of the plate 190 engages a corresponding recess in the underside of each filler wire spool 180, so that the plate 190 rotates with the spool as filler wire is withdrawn by the wire drive 181.

A number of pressure pins 194 extend through and beyond the body 191 to contact the underside 195 of the plate 190. The opposite ends of the pressure pins 194 are in contact with the ring 196 at the lower end of the body 191, and the ring is biassed toward the plate 190 by a number of compression springs 197 which are retained between the ring and the end member 198. The end member 198 may be attached to the body 191 by the threaded connection 199, so that the compressive force of the springs 197 against the ring 196 can be adjusted by rotating the end member 198 relative to the body 191. The upward force of the ring 196 against the pressure pins 194 provides frictional drag force on the plate 190, so that filler wire is removed from the spool 180 against an adjustable constant drag force.

Contained within the latching knob 193 is a pair of latch fingers 203a and 203b, seen in FIG. 10, each of which has an inner side provided with rack teeth 204 which engage a gear 205 connected to a shaft 206 that is turned by rotation of the latching knob 193. Each of the latch fingers 203a and 203b is slidably mounted within a corresponding passage 207a and 207b within the uppermost portion of the mandrel 189, and the dowel pins 210a and 210b fit within corresponding slots 211a and 211b to limit the inner and outer travel of the latch fingers.

The latch fingers may have a sloped lower surface, best seen in FIG. 2, which can engage the outside of a filler wire spool 180 to urge the spool downwardly into firm contact with the plate 190 and the button 192, so that the spool 180 is quickly latched into position with only a partial turn of the latching knob 193. The latching knob is preferably in the shape of an enlarged truncated cone, as seen in FIGS. 1 and 2, to aid in guiding the feed wire spools onto the mandrel 189 and for ease of rotation by a workman wearing gloves or mittens.

It will be understood that the foregoing relates only to a preferred embodiment of the present invention, and that numerous changes and modifications may be made therein without departing from the spirit and the scope of the invention as set forth in the following claims.

We claim:
1. Apparatus for supporting a spool, comprising:
    body means
    a spool receiving mandrel rotatably mounted on said body means and extending to an outer end spaced apart from said body means;
    spool support member carried by said mandrel and having means for engaging a spool which is supported thereon, so that the spool cannot rotate relative to said spool support member and mandrel;
    means defining a frictional contact surface which rotates with rotation of said spool support member;
    a plurality of separate members supported by said body means for movement into frictional contact with said contact surface;
    means operatively associated with said separate members to apply a selectably variable uniform force to each of said separate members so as to impart a selectably variable amount of drag force to said spool support member and spool receiving mandrel;
    a latching member carried by said spool receiving mandrel at said outer end thereof for a limited extent of rotation relative to said mandrel; and
    latching means carried by said spool receiving mandrel and movable outwardly therefrom to engage and retain a spool thereon, in response to said relative rotation of said latching member.
2. Apparatus as in claim 1, wherein:
    said force applying means comprises a force member positioned to contact each of said separate members; and
    a plurality of resilient means which support said force member at spaced apart locations therealong so as to urge said force member toward said separate members.
3. Apparatus as in claim 2, further comprising means for supporting said plurality of resilient means in selectively adjustable relation with respect to said force member, so as to provide said selective variation of the drag force.
4. Apparatus as in claim 1, wherein said latching means comprises at least one member having a sloped spool-contacting surface which engages a spool and forces the spool toward said spool support member as said latching member is moved outwardly from said mandrel, so as to urge the spool firmly against said spool support member.
5. Apparatus for supporting a spool, comprising:
    body means;
    a spool receiving member rotatably mounted on said body means;
    means mounted for rotation with said spool receiving member and having a surface which extends radially with respect to the axis of rotation of said member;
    a plurality of pressure pins supported on said body means in spaced apart and nonrotating relation to said axis and supported for axial movement into frictional contact with said surface; and
    means resiliently urging said pressure pins into contact wih said surface with a selectably variable force, so as to impart a selectably variable amount of drag force to said spool receiving member.
6. Apparatus as in claim 5, wherein said urging means comprises:
    a unitary member operatively engaging each of said pressure pins; and
    a plurality of separate resilient means operatively interposed between said body means and said unitary member so as to urge said unitary member into engagement with said pressure pins, and so as to yield whenever one or more of the pressure pins is axially moved by movement of the spool receiving member.
7. Apparatus as in claim 6, wherein:
    said body means comprises a first portion which supports said pressure pin, and a second portion which extends beyond said first portion; and
    an end member which is connected to said second portion for selectively variable spacing relative to said surface;
    said resilient means being carried by said end member so as to urge said unitary member with a variable force which is determined by the position of said end member.

* * * * *